(12) United States Patent
Oomen et al.

(10) Patent No.: US 11,464,340 B2
(45) Date of Patent: Oct. 11, 2022

(54) SUSPENSION SEATING SURFACE EDGE ENCAPSULATION METHOD, SEATING SURFACE CARRIER AND SEAT MADE THEREWITH

(71) Applicant: Illinois Tool Works Inc., Glenview, IL (US)

(72) Inventors: Craig Martin Oomen, Lowell, MI (US); Randy James Sayers, Howard City, MI (US); Robert A. Bratty, Stanton, MI (US); Kelly Washburn, Middleville, MI (US); Michael Long, Sparta, MI (US); Michael Stanton, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/265,463

(22) PCT Filed: Aug. 1, 2019

(86) PCT No.: PCT/US2019/044689
§ 371 (c)(1),
(2) Date: Feb. 2, 2021

(87) PCT Pub. No.: WO2020/028678
PCT Pub. Date: Feb. 6, 2020

(65) Prior Publication Data
US 2021/0315384 A1 Oct. 14, 2021

Related U.S. Application Data

(60) Provisional application No. 62/714,168, filed on Aug. 3, 2018.

(51) Int. Cl.
*A47C 4/06* (2006.01)
*A47C 4/30* (2006.01)
(Continued)

(52) U.S. Cl.
CPC ............... *A47C 7/282* (2013.01); *A47C 7/32* (2013.01); *A47C 31/023* (2013.01);
(Continued)

(58) Field of Classification Search
CPC ......... A47C 7/282; A47C 7/32; A47C 31/023; A47C 31/026
(Continued)

(56) References Cited

U.S. PATENT DOCUMENTS 94,553 A * 9/1869 Bingham ............... A47C 31/02
5/403
662,647 A * 11/1900 Howe ..................... E06B 7/32
297/452.64
(Continued)

FOREIGN PATENT DOCUMENTS

DE 102012020711 B4 4/2014
GB 1222908 A 2/1971

OTHER PUBLICATIONS

International Search Report and Written Opinion for PCT/US2019/044689, dated Nov. 22, 2019 (11 pages).
(Continued)

*Primary Examiner* — Rodney B White
(74) *Attorney, Agent, or Firm* — Quarles & Brady LLP

(57) ABSTRACT

A seat includes a seat surface having a periphery and a carrier overmolded onto the seat surface over the periphery. The carrier has a periphery and a frame is overmolded onto the carrier over the carrier periphery. The seat is assembled without fasteners. A method for making the seat includes overmolding a carrier onto a periphery of a seat surface to form a seat surface/carrier assembly, tensioning the seat surface/carrier assembly in a mold and overmolding a frame onto a periphery of the seat surface/carrier assembly.

20 Claims, 3 Drawing Sheets

(51) Int. Cl.
  *A47C 7/28* (2006.01)
  *A47C 31/02* (2006.01)
  *A47C 7/32* (2006.01)
  *B29C 45/14* (2006.01)
  *B29L 31/44* (2006.01)

(52) U.S. Cl.
  CPC ...... *A47C 31/026* (2013.01); *B29C 45/14262* (2013.01); *B29C 2045/14278* (2013.01); *B29L 2031/443* (2013.01)

(58) Field of Classification Search
  USPC ....... 297/218.1, 218.3, 218.4, 218.5, 452.12, 297/452.13, 452.56, 452.63, 452.64
  See application file for complete search history.

(56) References Cited

U.S. PATENT DOCUMENTS

| | | | | |
|---|---|---|---|---|
| 1,955,187 | A * | 4/1934 | Howard | A47C 31/02 428/102 |
| 3,088,517 | A * | 5/1963 | Schwartz | A47C 7/22 297/452.63 X |
| 3,175,269 | A * | 3/1965 | Raduns | A47C 7/22 297/452.63 X |
| 3,179,469 | A * | 4/1965 | Heuston | A47C 7/282 297/452.56 |
| 3,498,668 | A * | 3/1970 | Vanderminden | A47C 4/30 297/45 |
| 3,844,612 | A * | 10/1974 | Borggren | A47C 5/06 297/451.3 |
| 5,121,963 | A * | 6/1992 | Kwasnik | B60N 2/793 297/218.5 X |
| 6,378,944 | B1 * | 4/2002 | Weisser | A47C 7/40 297/218.5 X |
| 6,478,382 | B1 * | 11/2002 | Schulte | B60N 2/58 297/218.3 X |
| 6,511,562 | B1 * | 1/2003 | Coffield | B29C 66/12421 297/218.5 X |
| 6,540,950 | B1 | 4/2003 | Coffield | |
| 6,767,066 | B1 * | 7/2004 | Tornero | A47C 7/282 297/354.1 |
| 6,942,300 | B2 | 9/2005 | Numa | A47C 7/40 297/452.56 |
| 6,966,606 | B2 * | 11/2005 | Coffield | B29C 45/14065 297/452.56 |
| 6,983,997 | B2 * | 1/2006 | Wilkerson | A47C 7/282 297/452.56 |
| 7,021,718 | B2 | 4/2006 | Coffield et al. | |
| 7,040,834 | B2 * | 5/2006 | Nardi | A47C 31/023 297/440.11 |
| 7,159,293 | B2 | 1/2007 | Coffield et al. | |
| 7,600,304 | B2 * | 10/2009 | Nagele | B60N 2/5825 156/66 |
| 8,109,576 | B2 * | 2/2012 | Lin | A47C 7/40 297/452.56 X |
| 8,329,281 | B2 | 12/2012 | Coffield | |
| 8,465,007 | B2 | 6/2013 | Coffield et al. | |
| 8,616,655 | B2 * | 12/2013 | Jung | A47C 31/023 297/452.56 |
| 9,126,519 | B2 * | 9/2015 | Uebelacker | B60N 2/68 |
| 10,874,220 | B2 * | 12/2020 | Aldrich | B29C 70/56 |
| 11,134,792 | B2 * | 10/2021 | Case | A47C 31/023 |
| 2003/0001420 | A1 * | 1/2003 | Koepke | A47C 7/46 297/440.15 |
| 2003/0071509 | A1 * | 4/2003 | Neil | A47C 7/16 297/440.11 |
| 2003/0080595 | A1 * | 5/2003 | Wilkerson | A47C 31/126 297/300.2 |
| 2003/0168901 | A1 * | 9/2003 | Wilkerson | A47C 7/14 297/452.56 |
| 2003/0209935 | A1 * | 11/2003 | Legal | A47C 5/06 297/452.63 |
| 2005/0127735 | A1 | 6/2005 | Munsch | |
| 2006/0006715 | A1 * | 1/2006 | Chadwick | A47C 31/003 297/300.4 |
| 2007/0170756 | A1 * | 7/2007 | Kang | A47C 31/023 297/218.5 |
| 2008/0157575 | A1 * | 7/2008 | Janz | B60N 2/5664 297/218.1 |
| 2009/0289490 | A1 * | 11/2009 | Lin | A47C 31/023 297/445.1 |
| 2009/0315384 | A1 * | 12/2009 | Yang | A47C 7/282 297/452.47 |
| 2009/0317600 | A1 * | 12/2009 | Lee | A47C 7/282 428/193 |
| 2012/0025574 | A1 * | 2/2012 | Wilkinson | A47C 7/40 297/300.1 |
| 2016/0198811 | A1 * | 7/2016 | Mahe | B29C 45/44 24/444 |
| 2016/0206102 | A1 * | 7/2016 | Aldrich | B29C 55/165 |
| 2017/0283071 | A1 * | 10/2017 | Velasco | B64D 11/0649 |
| 2017/0355129 | A1 | 12/2017 | McGraw | |
| 2020/0039399 | A1 * | 2/2020 | Oomen | H05B 3/145 |
| 2021/0227992 | A1 * | 7/2021 | Oomen | A47C 7/282 |
| 2021/0353067 | A1 * | 11/2021 | Oomen | A47C 7/282 |

OTHER PUBLICATIONS

Office Action from corresponding German Patent Application No. 11 2019 003 915.6, dated Aug. 26, 2022 (9 pages).

* cited by examiner

PRIOR ART

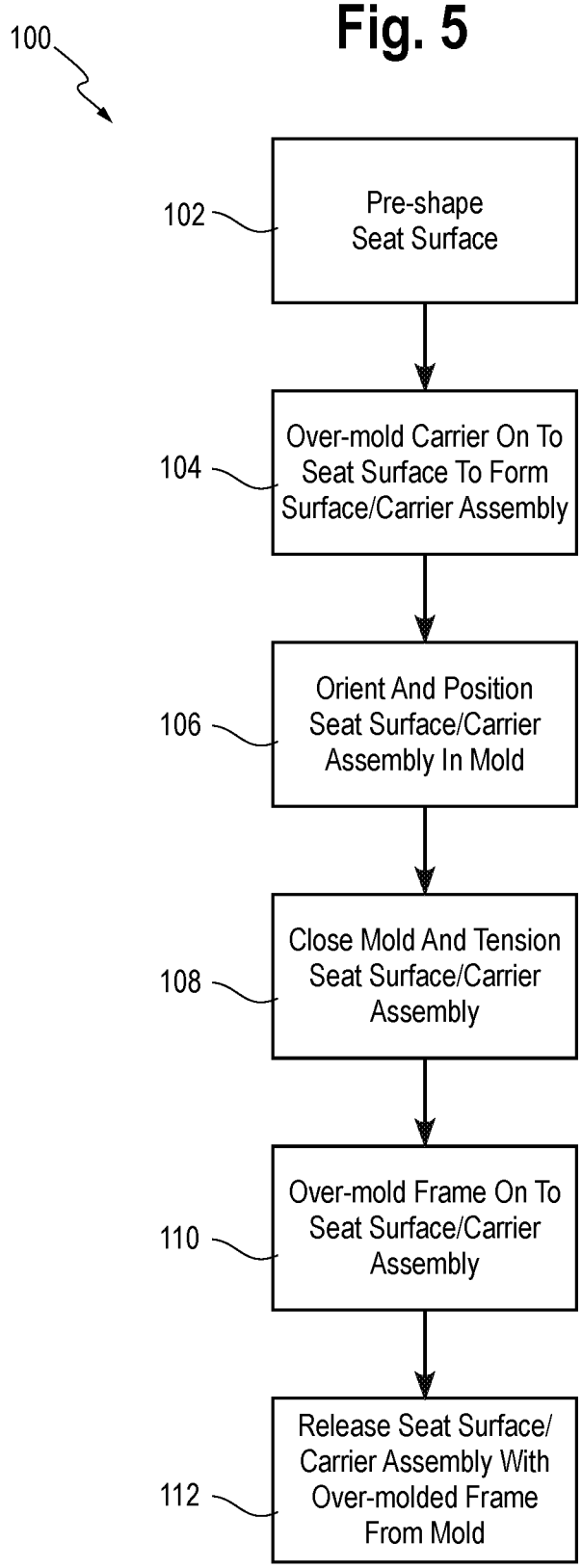

SUSPENSION SEATING SURFACE EDGE ENCAPSULATION METHOD, SEATING SURFACE CARRIER AND SEAT MADE THEREWITH

The present application represents the United States National Stage of International Application No. PCT/US2019/044689, filed Aug. 1, 2019, which claims priority to U.S. Provisional Patent Application No. 62/714,168, filed Aug. 3, 2018, the entire contents of which are incorporated by reference in their entirety.

BACKGROUND

The present invention relates to suspension seating, such as fabric seating and more particularly, to a method to encapsulate an edge of a suspension member, such as a suspension fabric for seating, a carrier for the suspension member and a seat made with the edge encapsulated suspension member.

Suspension or suspended fabrics have come into common use as an alternative to hard surfaces and foam padded surfaces for seating. Such suspension fabric seating surfaces can provide the comfort of foam padded surfaces in a weight similar to hard plastic seating and at relatively low cost. Advantageously, suspension fabric seating provides enhanced comfort using a preset tension in the suspension fabric that is adjustable for reaction force for comfort needs, provides tunable pixel element spacing and adjustable pixelated face sizes and shapes.

In the manufacture of fabric suspension seating, a carrier is injection molded in an over-molded process, on to the fabric. The carrier can be over-molded onto the fabric with or without the fabric being under a specified tension. Examples of over-molded carriers on untensioned suspension fabric are as disclosed in Coffield, U.S. Pat. No. 6,540,950, Coffield, U.S. Pat. No. 6,966,606, Coffield et al., U.S. Pat. No. 7,021,718 and Coffield, et al. U.S. Pat. No. 7,159,293. An example of an over-molded carrier on a tensioned suspension fabric is disclosed in Coffield, U.S. Pat. No. 7,618,572. However, it has been observed that in known manufacturing operations, during the molding process, the fabric may be pushed to the A surface (the occupant facing surface), which creates an unacceptable visual appearance and raises quality issues.

After the fabric is molded to the carrier, secondary operations are needed to attach the carrier/fabric assembly to the suspension frame component. This is an effective method to ensure tension is properly set and maintained throughout the product life. However, there are drawbacks to such secondary operations.

One drawback to these secondary operations is that following overmolding the carrier to the fabric, and prior to assembly to the frame, the fabric must be trimmed from the outside of the carrier. Fabric trimming is carried out manually and is an imperfect process. Improperly trimmed carrier/fabric assemblies can show on final assembly as poor quality, may prevent proper fit of the carrier to the frame, and as such the carrier may not be flush with the frame—again, exhibiting poor quality.

Another drawback to the current manufacturing method is that screws are used to secure the carrier/fabric assembly to the frame. Missing or improperly torqued screws can result in carrier to frame gaps and inconsistent flush of the carrier and, over time, can result in the carrier separating and pulling away from the frame. Moreover, setting the carrier into position in the frame is physically demanding and labor intensive. As such, robotics are sometimes used to press carriers into frames.

Other drawbacks include component susceptibility to failure. It has been found that low moisture embrittlement can cause carrier failure during post molding assembly stretch of the carrier. Frame embrittlement can also result from flex requirements during the carrier assembly to the structural frame. And, components are also susceptible to failure during post mold assembly of carrier to frame because of multiple color combinations and colorant additive contamination.

Aesthetically, current manufacturing processes have drawbacks as well. For example, current carrier designs require two to three character lines or seams/separations between the carrier and frame, to allow the fabric, carrier and frame components to fit flush on the product global surface. Carrier positions within the frame are limited to specific locations due to manufacturing requirements and physics. Design freedom is needed to enhance styling differentiation for future products.

Accordingly, there is a need for suspension fabric seating surface having an overmolded encapsulated edge that is overmolded into a frame. Desirably, the fabric seating surface encapsulated edge forms a carrier for the surface and the carrier is overmolded into the frame. More desirably still, a mounting of the carrier to the frame is done without fasteners, while minimizing the number of visible character lines. Still more desirably, characters lines and gaps are eliminated to reduce or eliminate dirt and debris traps on the seat complete. More desirably still, a method of making a seat eliminates laborious steps, including the need to trim excess fabric after the carrier is overmolded onto the fabric.

SUMMARY

In one aspect a seat includes a seat surface having a periphery and a carrier overmolded onto the seat surface over the periphery. The carrier has a periphery and a frame is overmolded onto the carrier over the carrier periphery. In an embodiment, the seat is assembled without fasteners, and has no more than one visible character line.

In an embodiment, the seat surface is a fabric, such as a woven fabric. The fabric can be formed from a weave of elastic and non-elastic fibers. Alternately, the seat surface can be a polymeric membrane, such as an oriented block copolymer membrane.

In an embodiment, the carrier is overmolded onto the seat surface while the seat surface is under minimal tension, the tension being sufficient to maintain the fabric taut, and the frame is overmolded onto the seat surface/carrier assembly while the seat surface/carrier assembly is under tension. In an embodiment, the seat surface defines a plurality of zones and wherein the tension in a zone is different from a tension in a different zone.

In an embodiment, the frame includes a stop portion abutting the carrier so as to prevent loosening or pull-out of the seat surface/carrier assembly from the frame.

A method for making a seat includes overmolding a carrier onto a periphery of a seat surface to form a seat surface/carrier assembly, tensioning the seat surface/carrier assembly in a mold and overmolding a frame onto a periphery of the seat surface/carrier assembly.

In a method, in the step of overmolding the carrier onto the periphery of the seat surface, the seat surface is held under minimal tension, and a desired tension of the seat surface is set in the tensioning step. In a method, the seat surface defines a plurality of zones and wherein the tension in a zone is different from a tension in a different zone.

Any excess fabric outside of the periphery of the seat surface/carrier assembly can be consumed in the step of overmolding the frame onto the periphery of the seat surface/carrier assembly.

In a method, the seat surface/carrier assembly is tensioned by a portion of the mold. The seat surface/carrier can be formed having a plurality of zones, and the tension applied to the seat surface/carrier is different in at least one zone from others of the zones.

These and other features and advantages of the present device will be apparent from the following description, taken in conjunction with the accompanying sheets of drawings, and in conjunction with the appended claims.

BRIEF DESCRIPTION OF THE DRAWINGS

The benefits and advantages of the present embodiments will become more readily apparent to those of ordinary skill in the relevant art after reviewing the following detailed description and accompanying drawings, wherein:

FIG. 5 is flowchart illustrating an example of a method of making the seat.

DETAILED DESCRIPTION

Figure 1A:
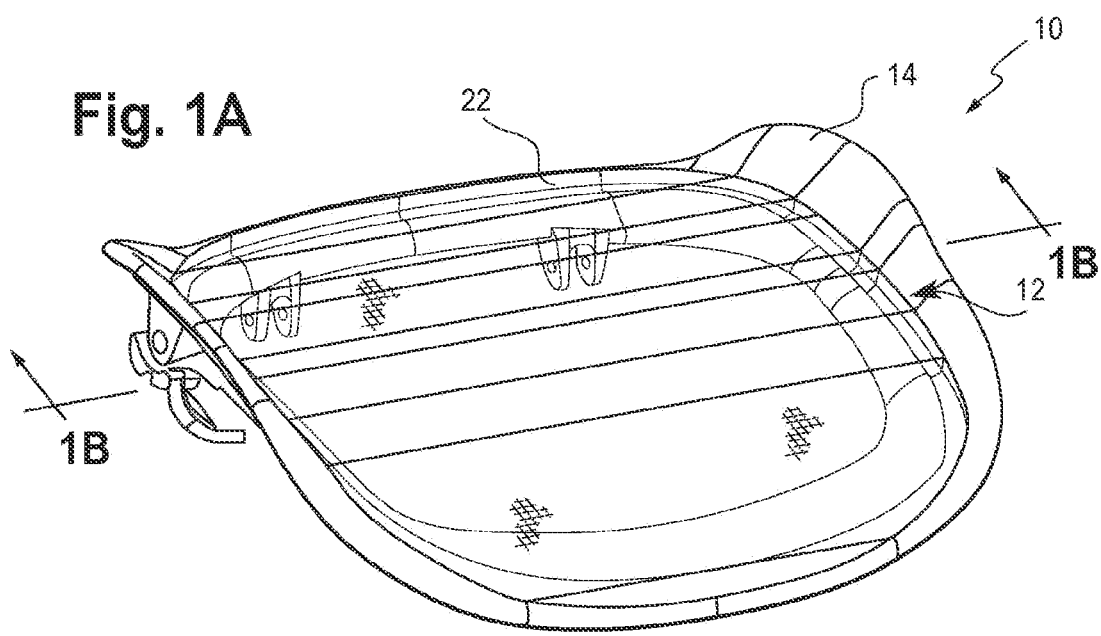
FIGS. 1A and 1B are illustrations of a known suspension seat bottom, FIG. 1B being a sectional view taken along line 1B-1B of FIG. 1A.

While the present disclosure is susceptible of embodiment in various forms, there is shown in the drawings and will hereinafter be described one or more embodiments with the understanding that the present disclosure is to be considered illustrative only and is not intended to limit the disclosure to any specific embodiment described or illustrated.

Figure 1B:
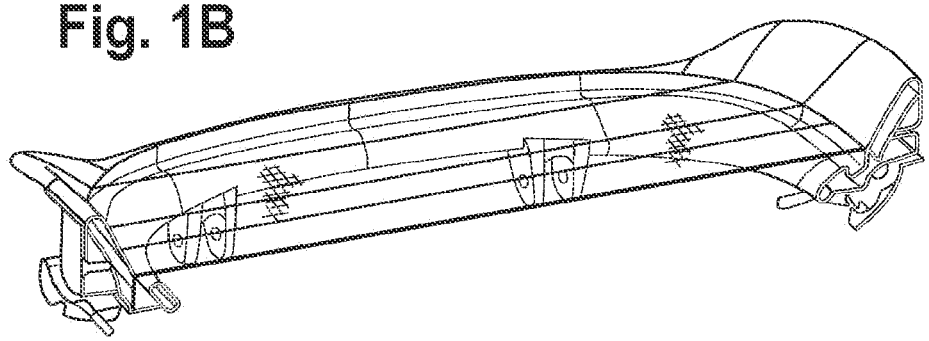
Figure 2A:
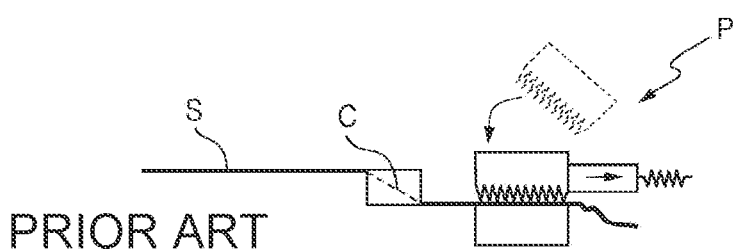
FIGS. 2A and 2B illustrate a known method of overmolding a carrier on a suspension seat surface (FIG. 2A) and a known method of mounting the known overmolded suspension seat surface and carrier to the seat bottom frame (FIG. 2B)

Referring to the figures and in particular to FIGS. 1A and 1B, there is shown a seat 10 having a suspension member, such as the illustrated suspension fabric seat bottom surface 12 secured in a frame 14 by a carrier in accordance with the present disclosure. As shown in FIG. 2A, in a known seat bottom, the carrier C is overmolded onto the seat bottom surface S as the seat bottom surface is held in tension. Tension is drawn in the seat bottom surface to about that desired for the end product (the seat), and the seat bottom surface (the fabric) is secured in clamps P at a location on the fabric outside of the carrier periphery. Tension is pulled in the seat bottom to about the final desired tension of the surface as mounted to the seat. After the carrier is overmolded onto the fabric, the fabric is trimmed to the outer edge of the carrier.

Figure 2B:
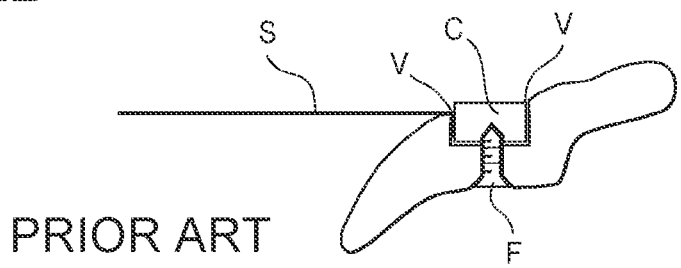

As seen in FIG. 2B, in assembling the seat bottom, the tensioned seat surface S and carrier C is pulled (tensioned) and mounted to the frame. In a typical mounting, the carrier is inserted into a recess or channel in the frame and is then secured in place by fasteners F, such as screws. The screws are driven through the frame in a location that is preferably not visible (as through the bottom of a seat bottom or through the back of a seat back) to as to minimize the visual and aesthetic impact on the seat.

In addition, as see in FIG. 2B, with the carrier mounted to the frame, there are two visible character lines V or seams on the visible portion of the seat. This also has an impact on the visual and aesthetic appeal of the seat.

Figure 3A:
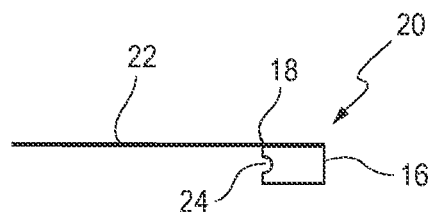
FIGS. 3A and 3B illustrate one example of a method of overmolding a carrier on a suspension seat surface (FIG. 3A) and a method of mounting the overmolded suspension seat surface and carrier to the set bottom frame (FIG. 3B), in accordance with the present disclosure.
Figure 3B:
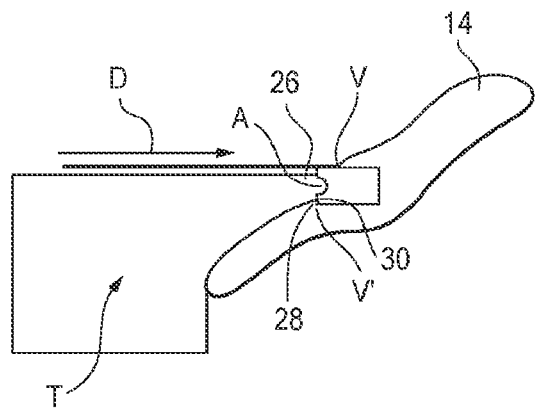

Referring now to FIGS. 3A and 3B, there is shown a suspension seat member 10 having a carrier encapsulated edge 18 and the seat and encapsulated edge assembly (referred to herein as the seat surface/carrier assembly 20) assembled to a seat frame 14. FIG. 3A illustrates the seat surface 22 having the carrier 16 overmolded to the edge 18 of the surface 22. The carrier 16 is semi-rigid and is overmolded with the surface 22 in minimal tension. That is, the surface 22 is drawn taut, but not under tension and the carrier 16 is overmolded to the edge 18 of the surface 22 to form the seat surface/carrier assembly 20. It is anticipated that there will be little to no trimming required of the surface 22 material outside of a periphery of the carrier 16 periphery in that any excess material will be overmolded by the frame 14 as noted below. The carrier 16 can be formed having one or more aligning elements 24. An example of such an aligning element 24 is the illustrated aligning recess formed on an inner surface 26 of the carrier 16.

It will be understood that the suspension fabric seat 10 can be a seat bottom, a seat back, a headrest or any other suitable surface and that references to seat, seat surface and the like include seat bottoms, seat backs, and headrests and other surfaces all of which are within the scope and spirit of the present disclosure. It is also to be understood that seat surface, seat and the like includes all such seat surfaces including, for example, fabric seat surfaces, polymeric membrane surfaces and the like capable of having an edge of the seat surface encapsulated, and that all such seat surfaces are within the scope and spirit of the present disclosure.

In an embodiment, the seat surface 22 can include a fabric seat or a polymeric membrane surface. In one example, a fabric seat surface can be woven from fibers. In a known woven fabric, the fibers or yarns that extend in the front-to-rear direction of a seat bottom surface or a top-to-bottom direction in a seat back surface or headrest are referred to as warp fibers. In some known seat surfaces, the warp fibers are relatively non-elastic, whereas the weft fibers, which extend in a side-to-side direction transverse to the warp fibers, are elastic. Warp fibers can be formed from, for example, polyester yarn having a linear elasticity of no more than about 5 percent; weft fibers can be formed from, for example, a block copolymer mono-filament and can have a linear elasticity of about 15-20%. One example of such as seating surface is disclosed in Coffield, U.S. Pat. No. 8,329,281, commonly assigned with the present application, and incorporated by reference herein in its entirety.

Other seat surfaces include, for example, an oriented polymeric membrane, such as an oriented block copolymer, for example, a molded, oriented block copolymer membrane, such as that disclosed in Coffield, et al., U.S. Pat. No. 8,465,007, commonly assigned with the present application, and incorporated by reference herein in its entirety.

In assembling or forming the frame 16, the seat surface/carrier assembly 20 is secured in a portion of the mold that forms a portion of the mold cavity. The portion of the mold that secures the seat surface/carrier assembly 20 exerts an outward force on the seat surface/carrier assembly 20 to create a desired tension in the seat surface 22. Thus, rather than assembling a pre-tensioned seat surface/carrier assembly, in the present method a force is exerted on the seat surface/carrier assembly 20 as it is overmolded to the frame 14 to establish the desired tension in the seat surface 22. Advantageously, as seen in FIG. 3B, in the present method, the location at which the force is applied to the carrier 16 has been relocated to the inside 26 of the carrier perimeter and pushes the surface 22 from the inside of the perimeter outwardly or radially from the center of the seat surface/carrier assembly. In embodiments, the seat surface 22 defines a plurality of zones and the tension in a zone can be different from a tension in a different zone. Zones can be, for example, along a front-to-back line on a seat bottom or a top-to-bottom line of a seat back or around the seat perimeter. Other zones will be appreciated by those skilled in the art.

As seen in FIG. 3B, the mold portion or tension slide T can include an aligning element A that cooperates with the carrier aligning element 24 to ensure proper alignment of the carrier 16 in the mold. As positioned in the mold, the seat surface/carrier assembly 20 is tensioned to the proper tension and the carrier 16 forms a part of the mold cavity. The frame 14 is molded around and encompasses a portion of the carrier 16. As seen in FIG. 3B, when the frame 14 and seat surface/carrier assembly 20 is removed from the mold there is a single visible character line V at any location at which the frame 14 is overmolded onto the carrier 16, thus providing a more aesthetically acceptable appearance. It will be appreciated that other non-visible character lines, such as line V', may be present in non—or less visible areas of the seat 10. Moreover, no screws or other fasteners are needed to mount the seat surface/carrier assembly 20 to the frame 14, reducing materials, labor and time to fabricate the seat 10. In addition, the present overmolding of the carrier 16 onto the seat surface 22 and the frame 14 onto the seat surface/carrier assembly 20 forms mechanical and/or chemical bonds of the material to one another, providing a structure having the necessary strength and integrity to meet vehicle requirements.

Figure 4:
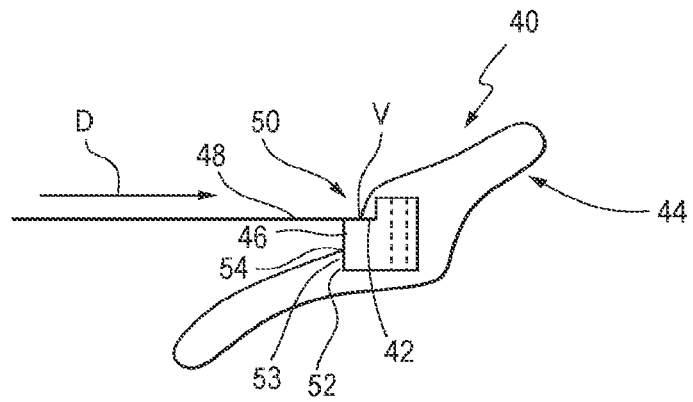
FIG. 4 illustrates another embodiment of an overmolded suspension seat surface mounted to a seat bottom frame.

An alternate embodiment of a suspension seat surface 40 having a carrier encapsulated edge 42 and the seat and edge assembly assembled to a seat frame 44 is illustrated in FIG. 4. In this embodiment, again, a carrier 46 is overmolded onto the seat surface 48 with the seat surface 48 in minimal tension. As positioned in the mold (not shown), the carrier 46 is tensioned to the proper tension and forms a part of the mold cavity, and the frame 44 is molded around and encompasses a portion of the carrier 46. As seen in FIG. 4, when the frame 44 and a seat surface/carrier assembly 50 are removed from the mold there is a single visible character line V at any location at which the frame 44 is overmolded onto the carrier 46, providing a more aesthetically acceptable appearance, and without the need for screws to mount the seat surface/carrier assembly 50 to the frame 44. It will be appreciated that other non-visible character lines, such as line V', may be present in non-or less visible areas.

In the embodiments in FIGS. 3B and 4, it will be appreciated that a stop portion 28, 53 of the frame 14, 44 overmold is positioned against a wall 30, 54 of the carrier 16, 46 transverse to the direction D of tension in the seat surface 22, 48. The stop portion 28, 53 of the frame 14, 44 serves to prevent pullout of the carrier 16, 46 from the frame 14, 44 and ensures that the seat surface 22, 48 remains in proper tension when the seat surface/carrier assembly 20, 50 is molded into the frame 14, 44.

Referring to FIG. 5, in one contemplated method 100 to encapsulate an edge of a suspension fabric for seating, the seat surface is pre-shaped at step 102 and the carrier is overmolded onto the periphery of the seat surface to form the seat surface/carrier assembly at step 104. The seat surface/carrier assembly is removed from a carrier injection mold using, for example, guide pins and opposing holes in the carrier around its perimeter. These holes in conjunction with robotic movement maintain proper orientation of the seat surface/carrier assembly, and fabric shape and form during transfer to a next molding step The seat surface/carrier assembly is loaded into a structural frame tool. The frame tool geometry can have increased degrees of design freedom because the secondary assembly processes have been eliminated. The frame tool accepts the seat surface/carrier assembly using a set of transfer pins around the perimeter of the carrier, which correspond to transfer pins in the frame tool. Transfer of the surface/carrier assembly is controlled so as to maintain the overall shape, form and tension in the surface/carrier assembly.

In one contemplated method as indicated at step 108, the frame tool includes moving cores, such as hydraulic moving cores that apply a controlled force on the carrier before and during mold close. Tension of the carrier (and thus the fabric) can be varied by zone to provide for different tensions in different zones of the seat surface. This allows the seat to be configured to meet specified comfort indention force deflection (IFD) targets.

The mold then closes and frame material is injected over the carrier at step 110. In a method, the frame material is restricted so as to not come into contact with the fabric. The carrier in its zoned stretched position is held in permanent position once the frame material cures or cools. Following cooling, the mold is opened and the seat is removed from the mold, as at step 112.

In an embodiment, the carrier is baffled to allow the hydraulic cores to stretch the surface/carrier assembly within the frame overmold step of the encapsulation process.

It will be appreciated that the present suspension seat with encapsulated edge and method to encapsulate an edge of a suspension member provide design freedom not achievable in prior known seat designs. Advantageously, such an encapsulated edge seat surface and method enhance design styling and allow for differentiation for seats. Such an encapsulated edge seat surface and method minimize or eliminate character lines and gaps that otherwise result in dirt and debris traps on the seat, and facilitate seat cleaning to improve the overall aesthetics of vehicle seats.

In the present disclosure, the words "a" or "an" are to be taken to include both the singular and the plural. Conversely, any reference to plural items shall, where appropriate, include the singular. It will be appreciated by those skilled in the art that the relative directional terms such as upper, lower, rearward, forward and the like are for explanatory purposes only and are not intended to limit the scope of the disclosure.

All patents or patent applications referred to herein, are hereby incorporated herein by reference, whether or not specifically done so within the text of this disclosure.

From the foregoing it will be observed that numerous modification and variations can be effectuated without departing from the true spirit and scope of the novel concepts of the present film. It is to be understood that no limitation with respect to the specific embodiments illustrated is intended or should be inferred. The disclosure is intended to cover by the appended claims all such modifications as fall within the scope of the claims.

The invention claimed is:

1. A seat, comprising:
   a seat surface having a seat periphery;
   a carrier overmolded onto the seat surface over the seat periphery such that the carrier forms a seat edge of the seat surface, the carrier having a carrier periphery; and
   a frame overmolded onto a portion of the carrier over the carrier periphery and in contact with the seat surface such that the carrier is at least partially received in the frame and a character line is formed between the frame and the carrier, the character line being located along the carrier between the seat edge and the carrier periphery.

2. The seat of claim 1, wherein the seat surface is a fabric.

3. The seat of claim 2, wherein the fabric is a woven fabric.

4. The seat of claim 1, wherein the seat surface is a molded polymeric membrane.

5. The seat of claim 1, wherein the carrier is overmolded onto the seat surface under a first tension, and
   wherein the frame is overmolded onto the carrier under a second tension, the second tension being greater than the first tension.

6. The seat of claim 1, wherein the seat has no more than one character line visible along the seat surface.

7. The seat of claim 1, wherein the frame includes a stop portion abutting an inner wall of the carrier that extends downwardly from the seat edge.

8. The seat of claim 7, wherein the carrier includes an aligning recess arranged on the inner wall of the carrier between the seat edge and the stop portion of the frame.

9. The seat of claim 1, wherein the seat surface defines a plurality of zones, and
   wherein a first zone of the seat surface has a first tension, and a second zone of the seat surface has a second tension that is different than the first tension.

10. A seat, comprising:
    a seat surface having a seat periphery;
    a carrier overmolded onto the seat surface over the seat periphery under a first tension, the carrier having a carrier periphery; and
    a frame overmolded onto the carrier over the carrier periphery under a second tension, the second tension being greater than the first tension,
    wherein the carrier is at least partially received in the frame and the frame abuts the seat surface.

11. The seat of claim 10, wherein the carrier includes an aligning recess arranged on an inner surface of the carrier, the aligning recess being configured to receive an aligning protrusion of a tension slide of a mold.

12. A seat, comprising:
    a seat surface having a seat periphery;
    a carrier overmolded onto the seat surface over the seat periphery such that the carrier forms a seat edge of the seat surface, the carrier having a carrier periphery; and
    a frame overmolded onto a portion of the carrier over the carrier periphery such that the carrier is at least partially received within the frame and a character line is formed between the frame and the carrier with the frame abutting the seat surface adjacent to the seat edge.

13. The seat of claim 12, wherein the seat surface is a fabric.

14. The seat of claim 12, wherein the carrier is overmolded onto the seat surface under a first tension, and
    wherein the frame is overmolded onto the carrier under a second tension, the second tension being greater than the first tension.

15. The seat of claim 12, wherein the seat surface defines a plurality of zones, and
    wherein a first zone of the seat surface has a first tension, and a second zone of the seat surface has a second tension that is different than the first tension.

16. The seat of claim 11, wherein the aligning recess is arranged on an inner wall of the carrier that extends downwardly from the seat edge.

17. The seat of claim 16, wherein a stop portion of the frame abuts the inner wall of the carrier below the aligning recess.

18. The seat of claim 10, wherein the seat surface defines a plurality of zones, and
    wherein a first zone of the seat surface has a third tension, and a second zone of the seat surface has a fourth tension that is different than the third tension.

19. The seat of claim 10, wherein the seat surface is a fabric.

20. The seat of claim 10, wherein the seat surface is a molded polymeric membrane.

* * * * *